(12) United States Patent
Su et al.

(10) Patent No.: US 9,634,813 B2
(45) Date of Patent: Apr. 25, 2017

(54) HITLESS MULTI-CARRIER SPECTRUM MIGRATION METHOD AND APPARATUS

(71) Applicant: Huawei Technologies Co., Ltd., Shenzhen (CN)

(72) Inventors: Wei Su, Amsterdam (NL); Qiuyou Wu, Shenzhen (CN); Yongheng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/919,280

(22) Filed: Oct. 21, 2015

(65) Prior Publication Data

US 2016/0043852 A1 Feb. 11, 2016

Related U.S. Application Data

(63) Continuation of application No. PCT/CN2013/074505, filed on Apr. 22, 2013.

(51) Int. Cl.
*H04Q 11/00* (2006.01)
*H04L 12/24* (2006.01)
(Continued)

(52) U.S. Cl.
CPC .......... *H04L 5/0053* (2013.01); *H04J 3/1652* (2013.01); *H04J 14/00* (2013.01);
(Continued)

(58) Field of Classification Search
None
See application file for complete search history.

(56) References Cited

U.S. PATENT DOCUMENTS

2011/0286408 A1\* 11/2011 Flore ............... H04L 5/0007
370/329
2012/0082456 A1 4/2012 Su et al.
(Continued)

FOREIGN PATENT DOCUMENTS

CN 1490968 A 4/2004
CN 101150879 A 3/2008
(Continued)

OTHER PUBLICATIONS

Patel ["Defragmentation of Transparent Flexible Optical WDM (FWDM) Networks" OSA/OFC/NFOEC 2011].\*
(Continued)

*Primary Examiner* — Oommen Jacob
(74) *Attorney, Agent, or Firm* — Leydig, Voit & Mayer, Ltd.

(57) ABSTRACT

A hitless multi-carrier spectrum migration method and apparatus are disclosed. The method includes: obtaining a spectrum of a secondary carrier and a to-be-migrated carrier in a target carrier group from a network management system, and generating the secondary carrier according to the spectrum of the secondary carrier; sending a migration notification to a peer network device, and performing answer response to the migration notification from the peer network device, where the answer response is used to determine that network devices at both ends can perform spectrum migration; sending migration signaling to the peer network device; and receiving the migration signaling sent by the peer network device, and migrating, according to the migration signaling, overhead information and a service that are borne on the to-be-migrated carrier in the target carrier group to the secondary carrier.

13 Claims, 10 Drawing Sheets

(51) Int. Cl.
H04J 14/02 (2006.01)
H04L 5/00 (2006.01)
H04J 3/16 (2006.01)
H04J 14/00 (2006.01)
H04L 27/26 (2006.01)
H04J 14/08 (2006.01)

(52) U.S. Cl.
CPC .......... *H04J 14/0257* (2013.01); *H04J 14/08* (2013.01); *H04L 5/0098* (2013.01); *H04L 27/2697* (2013.01); *H04Q 11/0066* (2013.01); *H04J 14/0267* (2013.01); *H04J 14/0298* (2013.01); *H04Q 2011/0086* (2013.01)

(56) References Cited

U.S. PATENT DOCUMENTS

| | | | | |
|---|---|---|---|---|
| 2012/0170936 | A1* | 7/2012 | Vissers | H04J 3/1658 398/58 |
| 2013/0227218 | A1* | 8/2013 | Chang | G06F 12/0866 711/118 |
| 2013/0295946 | A1* | 11/2013 | Panchal | H04W 16/14 455/452.1 |
| 2014/0099119 | A1* | 4/2014 | Wei | H04J 14/0257 398/79 |
| 2015/0200790 | A1* | 7/2015 | Lopez Alvarez | H04Q 11/0066 398/45 |
| 2015/0229528 | A1* | 8/2015 | Swinkels | H04L 41/0896 398/45 |
| 2016/0037242 | A1* | 2/2016 | Su | H04J 14/025 398/45 |
| 2016/0043852 | A1* | 2/2016 | Su | H04J 14/00 398/52 |
| 2016/0164597 | A1* | 6/2016 | Evans | H04J 14/0221 398/9 |

FOREIGN PATENT DOCUMENTS

| | | |
|---|---|---|
| CN | 102130787 A | 7/2011 |
| CN | 102204208 A | 9/2011 |
| CN | 102820951 A | 12/2012 |
| EP | 2874332 A1 | 5/2015 |
| WO | WO 2012104683 A1 | 8/2012 |

OTHER PUBLICATIONS

Zhang ["Dynamic and Adaptive Bandwidth Defragmentation in Spectrum-Sliced Elastic Optical Networks with Time-Varying Traffic" Journal of Lightwave Technology vol. 32, Issue: 5, Mar. 1, 2014].*

Proietti ["Quasi-Hitless Defragmentation Technique in Elastic Optical Networks by a Coherent RX LO With Fast TX Wavelength Tracking" 2012 International Conference on Photonics in Switching (PS), Sep. 11-14, 2012].*

Cugini ["Push-Pull Technique for Defragmentation in Flexible Optical Networks" OFC/NFOEC Technical Digest© 2012 OSA].*

Zhang [OFC'13—Elastic Optical Networks, 2013].*

Wang et al., "Blocking Performance in Dynamic Flexible Grid Optical Networks—What is the Ideal Spectrum Granularity?," 37th European Conference and Exhibition on Optical Communication, Geneva, Switzerland, Institute of Electrical and Electronics Engineers, New York, New York (Sep. 18-22, 2011).

Thiagarajan et al., "Spectrum Efficient Super-Channels in Dynamic Flexible Grid Networks—A Blocking Analysis," Optical Fiber Communication Conference and Exposition and the National Fiber Optic Engineers Conference, Los Angeles, California, Institute of Electrical and Electronics Engineers, New York, New York (Mar. 6-10, 2011).

"Series G: Transmission Systems and Media, Digital Systems and Networks; Digital terminal equipments—General; Series Y: Global Information Infrastructure, Internet Protocol Aspects and Next-Generation Networks; Internet protocol aspects—Transport; Interfaces for the optical transport network," Recommendation ITU-T G.709/Y.1331, pp. i-228, International Telecommunication Union, Geneva, Switzerland (Feb. 2012).

"Series G: Transmission Systems and Media, Digital Systems and Networks; Data over Transport—Generic aspects—General; Series Y: Global Information Infrastructure, Internet Protocol Aspects and Next-Generation Networks; Internet protocol aspects—Transport; Link capacity adjustment scheme (LCAS) for virtual concatenated signals," ITU-T Recommendation G.7042/Y.1305, pp. i-30, International Telecommunication Union, Geneva, Switzerland (Mar. 2006).

"ODUflex hitless resizing method," Telecommunication Standardization Sector, International Telecommunication Union, Geneva, Switzerland (Sep. 2009).

Fang et al., "A Novel Scheme for Realization of Flexible ODU Hitless Resizing," Symposium on Photonics and Optoelectronics, Institute of Electrical and Electronics Engineers, New York, New York (2010).

Gerstel, "Flexible use of Spectrum and Photonic Grooming," The Optical Society, Washington, D.C. (2010).

* cited by examiner

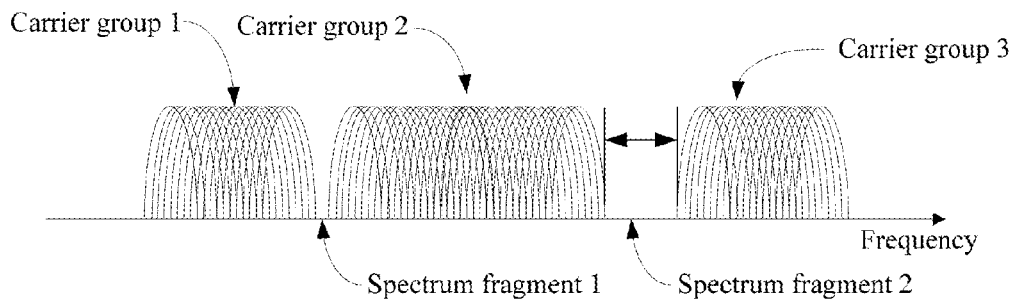
FIG. 1
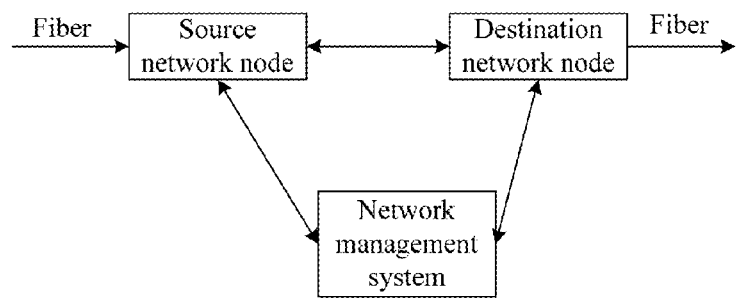
FIG. 2
FIG. 3

HITLESS MULTI-CARRIER SPECTRUM MIGRATION METHOD AND APPARATUS

CROSS-REFERENCE TO RELATED APPLICATIONS

This application is a continuation of International Patent Application No. PCT/CN2013/074505, filed on Apr. 22, 2013, which is hereby incorporated by reference in its entirety.

TECHNICAL FIELD

The present invention relates to the field of communications technologies, and more specifically, to a hitless multi-carrier spectrum migration method and apparatus.

BACKGROUND

As a core technology of a next generation transport network, an optical transport network (Optical Transport Network, OTN) includes electrical-layer and optical-layer technical specifications, and provides comprehensive operation, administration and maintenance (Operation, Administration and Maintenance, OAM), a powerful tandem connection monitoring (Tandem Connection Monitoring, TCM) capability, and an out-of-band forward error correction (Forward Error Correction, FEC) capability. The OTN technology can implement flexible dispatching and management of large-capacity services, and is gradually becoming a mainstream technology of a backbone transport network.

At an electrical processing layer, the OTN technology defines a standard encapsulation structure, maps various customer services, and can implement management and monitoring of the services. A structure of an OTN frame is shown in FIG. 1. The OTN frame is a structure of 4×4080 bytes, that is, 4 rows×4080 columns. The structure of the OTN frame includes a framing area, an OTUk (Optical Channel Transport Unit, optical channel transport unit) OH (Overhead, overhead), an ODUk (Optical Channel Data Unit, optical channel data unit) OH, an OPUk (Optical Channel Payload Unit, optical channel payload unit) OH, an OPUk payload area (Payload Area), and a FEC area, where values 1, 2, 3, and 4 of k correspond to rate levels 2.5G, 10G, 40G, and 100G respectively. The framing area includes a FAS (Frame Alignment Signal, frame alignment signal) and an MFAS (Multi-frame Alignment Signal, multi-frame alignment signal). Information in the OPUk OH is primarily used for mapping and adaptation management of a customer service, information in the ODUk OH is primarily used to manage and monitor an OTN frame, and information in the OTUk OH is primarily used to monitor a transmission section. A fixed rate of an OTUk is referred to as a line interface rate. Currently, line interface rates at four fixed rate levels 2.5G, 10G, 40G, and 100G are available. The OTN transmits a service in the following manner: an upper-layer service is mapped to an OPUj at a lower rate level, and an OPUj overhead and an ODUj overhead are added to form an ODUj, which may be referred to as a lower-order ODUj; then the lower-order ODUj is mapped to an OPUk at a higher rate level, and an OPUk overhead, an ODUk overhead, an OTUk overhead and a FEC are added to form a fixed-rate OTUk, which is referred to as a higher-order OTUk; the higher-order OTUk is modulated onto a single optical carrier for transmission, where a bearer bandwidth of the optical carrier is equal to the fixed rate of the higher-order OTUk. In addition, an ODUflex is introduced into the conventional OTN, and is referred to as a lower-order variable-rate optical channel data unit. The ODUflex is used to carry an upper-layer service at any rate. First, the lower-order ODUflex needs to be mapped to a higher-order OPUk, and an OPUk overhead, an ODUk overhead, an OTUk overhead and a FEC are added to form a fixed-rate higher-order OTUk, and then the higher-order OTUk is modulated onto a single optical carrier for transmission.

Explosively growing, flexible, and varied upper-layer customer IP (Internet Protocol, Internet Protocol) services have resulted in a pressing need for an optical transport technology beyond 100G, such as a 400G or 1T rate. This has posed a significant challenge for a conventional optical transport network system, and long-distance and high-rate transmission also needs to be supported. However, existing optical spectrum resources are divided according to a 50 GHz optical spectrum grid slot width, and a 50 GHz optical spectrum grid slot width is allocated to each optical carrier. For optical carriers whose bearer bandwidths are at four fixed rate levels 2.5G, 10G, 40G, and 100G, an optical spectrum width occupied by the optical carriers does not reach 50 GHz, leading to a waste of optical spectrum resources. Optical spectrums are limited resources. To fully use optical spectrum resources, improve overall transmission capabilities of a network, and implement transmission of ever-increasing upper-layer customer IP (Internet Protocol, Internet Protocol) services, a Flex Grid (flexible grid) technology is introduced into an optical layer. The Flex Grid technology is a variable spectral width technology, and extends optical spectrum resources from fixed 50 GHz optical spectrum grid slot division (ITU-T (International Telecommunication Union-Telecommunication Standardization Sector-Telecommunication, International Telecommunication Union-Telecommunication Standardization Sector-Telecommunication) G.694) to optical spectrum grid slot division at a smaller granularity. Currently, a minimum optical spectrum grid slot width is 12.5 GHz, and therefore one signal may occupy multiple consecutive optical spectrum grids.

Because the signal occupies multiple consecutive optical spectrum grids, available spectrums of an optical fiber may have a large number of idle spectrum areas, that is, spectrum fragments. As shown in FIG. 2, spectrum fragments 1 and 2 are generated in carrier groups 1, 2, and 3. When a new service needs to be transmitted, if spectral widths of the spectrum fragments 1 and 2 are less than a spectral width required by the new service, there are no available consecutive spectrum resources. Therefore, usage of the spectrum resources is low.

A network planning algorithm is adopted in the prior art to properly allocate spectrum resources of an optical fiber in advance for a specific network structure and service transmission requirements. Although this algorithm can optimize spectrum resource allocation to some extent, this algorithm cannot fundamentally avoid congestion because services are dynamically transmitted. A multi-carrier transport technology is adopted at an optical processing layer, and multi-carrier transmission based on a variable quantity of carriers is implemented by using a comb light source or multiple independent light sources, a multiplexer, a demultiplexer, and multiple modulators in the optical domain. However, a service interruption problem occurs in a subcarrier frequency change process. Therefore, hitless migration of spectrums between multiple carrier groups cannot be implemented.

SUMMARY

Embodiments of the present invention provide a hitless multi-carrier spectrum migration method and apparatus, to resolve a service impairment problem during migration of spectrums between multiple carrier groups.

According to a first aspect, an embodiment of the present invention provides a multi-carrier spectrum migration method, where the method includes the following steps:

obtaining a spectrum of a secondary carrier and a to-be-migrated carrier in a target carrier group from a network management system, and generating the secondary carrier according to the spectrum of the secondary carrier;

sending a migration notification to a peer network device, and performing answer response to the migration notification from the peer network device, where the answer response is used to determine that network devices at both ends can perform spectrum migration;

sending migration signaling to the peer network device, where the migration signaling is used to instruct the peer network device to switch a service that is borne on the to-be-migrated carrier in the target carrier group to the secondary carrier; and receiving the migration signaling sent by the peer network device, and migrating, according to the migration signaling, overhead information and the service that are borne on the to-be-migrated carrier in the target carrier group to the secondary carrier, where after the service that is borne on the to-be-migrated carrier is migrated to the secondary carrier, an idle spectrum corresponding to the to-be-migrated carrier and its adjacent idle spectrum form a consecutive idle spectrum area.

With reference to the first aspect, in a first possible implementation manner, the migration notification includes an adding notification and a removing notification, where the adding notification is borne on the secondary carrier, and the removing notification is borne on the to-be-migrated carrier.

With reference to the first aspect or the first possible implementation manner, in a second possible implementation manner, the adding notification is carried in an optical sub-channel transport unit OTUsub frame borne on the secondary carrier, and the removing notification is carried in an OTUsub frame borne on the to-be-migrated carrier.

With reference to the first aspect, the first possible implementation manner or the second possible implementation manner, in a fourth possible implementation manner, the migration signaling is used to instruct the peer network device to migrate overhead information and a service in the optical sub-channel transport unit OTUsub frame borne on the to-be-migrated carrier to the OTUsub frame borne on the secondary carrier.

With reference to the first aspect, or any one possible implementation manner of the first to the third possible implementation manners, in a fourth possible implementation manner, after the service is migrated, a source network device and a destination network device separately send idle signaling to each other, where the idle signaling indicates that the service has been migrated.

With reference to the first aspect, or any one possible implementation manner of the first to the fourth possible implementation manners, in a fifth possible implementation manner, the migration signaling is used to instruct the peer network device to switch the service starting from the Xth frame after a current frame, where X is a positive integer greater than 1.

According to a second aspect, an embodiment of the present invention provides a hitless multi-carrier spectrum migration apparatus, where the apparatus includes a controller, a tunable laser, a framer, and a modulator;

the controller is configured to: receive a spectrum of a secondary carrier, a spectrum of a target carrier group, a to-be-migrated carrier in the target carrier group, and a to-be-migrated optical sub-channel transport unit OTUsub frame corresponding to the to-be-migrated carrier from a network management system; send the spectrum of the secondary carrier and the spectrum of the target carrier group to the tunable laser; notify the modulator of the to-be-migrated carrier in the target carrier group; and notify the framer of the to-be-migrated OTUsub frame;

the tunable laser is configured to: generate the secondary carrier according to the spectrum of the secondary carrier; and generate carriers in the target carrier group according to the spectrum of the target carrier group, where the carriers in the target carrier group include the to-be-migrated carrier;

the framer is configured to: determine the to-be-migrated OTUsub frame that is notified by the controller and generate a secondary OTUsub frame; encapsulate a migration notification into an overhead of the to-be-migrated OTUsub frame and an overhead of the secondary OTUsub frame, and send the to-be-migrated OTUsub frame and the secondary OTUsub frame to the modulator; and after determining, according to an answer response fed back by a peer network device, that a current network device has successfully negotiated with the peer network device, encapsulate overhead information and a service carried in the to-be-migrated OTUsub frame into the secondary OTUsub frame and send the secondary OTUsub frame to the modulator; and the modulator is configured to: receive the to-be-migrated OTUsub frame and the secondary OTUsub frame that are sent by the framer; modulate the secondary OTUsub frame to the secondary carrier and send the secondary OTUsub frame to the peer network device; and modulate the to-be-migrated OTUsub frame to the to-be-migrated carrier and send the to-be-migrated OTUsub frame to the peer network device.

With reference to the second aspect, in a first possible implementation manner, the network device further includes a demodulator, and the demodulator is configured to receive a first carrier group and a second carrier group, modulate a first group of OTUsub frames from the first carrier group, and modulate a second group of OTUsub frames from the second carrier group, where the first group of OTUsub frames includes the to-be-migrated OTUsub frame and the secondary OTUsub frame, the to-be-migrated OTUsub frame and the secondary OTUsub frame each carry the answer response, and the second group of OTUsub frames includes the secondary OTUsub frame but does not include the to-be-migrated OTUsub frame.

With reference to the second aspect or the first possible implementation manner, in a second possible implementation manner, the framer is further configured to: receive the first group of OTUsub frames and the second group of OTUsub frames from the demodulator; use the second group of OTUsub frames to form a bearer container after determining, according to the answer response carried in the to-be-migrated OTUsub frame and the secondary OTUsub frame, that the current network device has successfully negotiated with the peer network device; and extract the service from the bearer container.

With reference to the second aspect, the first possible implementation manner, or the second possible implementation manner, in a third possible implementation manner, the migration notification includes an adding notification and a removing notification, where the adding notification is carried in the OTUsub frame borne on the secondary carrier, and the removing notification is carried in the OTUsub frame borne on the to-be-migrated carrier.

With reference to the second aspect, or any one possible implementation manner of the first to the third possible implementation manners, in a fourth possible implementation manner, migration signaling is used to instruct the peer network device to migrate overhead information and a service in the OTUsub frame borne on the to-be-migrated carrier to the OTUsub frame borne on the secondary carrier.

With reference to the second aspect, or any one possible implementation manner of the first to the fourth possible implementation manners, in a fifth possible implementation manner, after the service is migrated, a source network device and a destination network device separately send idle signaling to each other, where the idle signaling indicates that the service has been migrated.

With reference to the second aspect, or any one possible implementation manner of the first to the fifth possible implementation manners, in a sixth possible implementation manner, the migration signaling is used to instruct the peer network device to switch the service starting from the Xth frame after a current frame, where X is a positive integer greater than 1.

In the embodiments of the present invention, after a service borne on a to-be-migrated carrier is migrated to a secondary carrier, an idle spectrum corresponding to the to-be-migrated carrier and its adjacent idle spectrum can form a consecutive idle spectrum area. In addition, a spectral width of the consecutive idle spectrum area is not less than a spectral width required to transmit a new service. This meets a spectral width requirement of the new service.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1 is a schematic diagram of an OTN frame structure in the ITU-T G.709 standard provided in the prior art;

FIG. 2 is a schematic diagram of spectrum fragments according to an embodiment of the present invention;

FIG. 3 is a schematic diagram of a network system according to an embodiment of the present invention;

DESCRIPTION OF EMBODIMENTS

Figure 4:
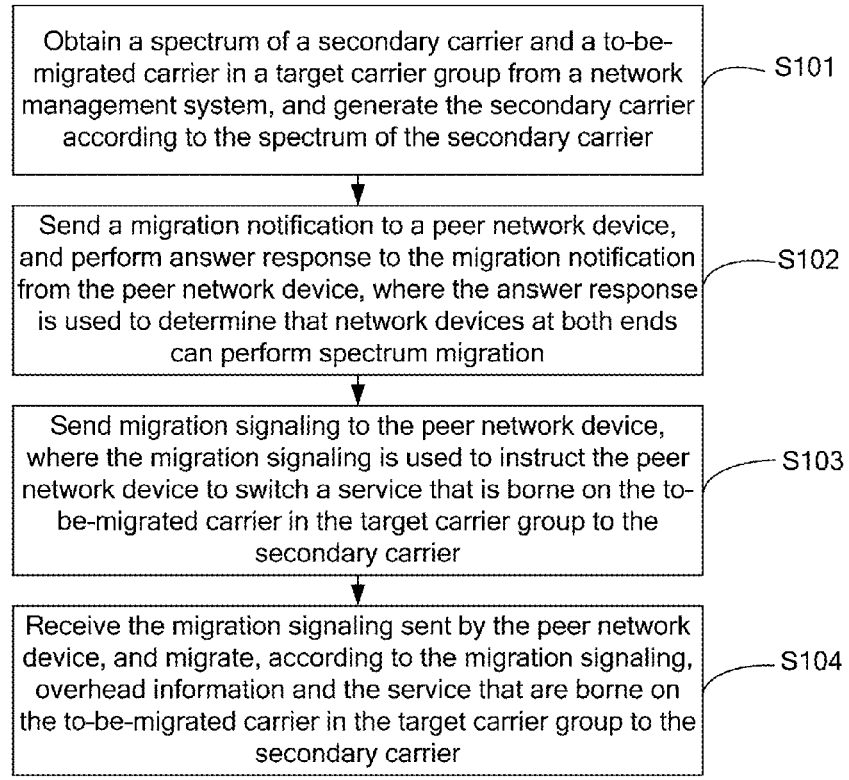
FIG. 4 is a flowchart of implementing a hitless multi-carrier spectrum migration method according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the embodiments of the present invention, as shown in FIG. 3, a network management system (NMS for short) manages and allocates available spectrum resources of an optical fiber. When a consecutive idle spectrum area of the optical fiber cannot meet a transmission requirement of a new service, the NMS selects a target spectrum area from all idle spectrum areas, determines spectrums of one or more secondary carriers in the target spectrum area, determines a target carrier group to be migrated and one or more to-be-migrated carriers in the target carrier group, and notifies a network device of the spectrums of the secondary carriers and the to-be-migrated carriers in the target carrier group. When a service is transmitted between two network nodes, a node that sends the service is referred to as a source network device, and a node that receives the service is referred to as a destination network device.

The service includes:

(1) customer data, a CBR (Constant Bit Rate, constant bit rate) service, a Packet (packet) service;

(2) a lower-order ODUt service, including ODU0, ODU1, ODU2, ODU2e, ODU3, ODU4, and an ODUflex defined in the ITU-T G.709 standard.

Optionally, a rule of selecting the target spectrum area by the NMS includes two aspects:

1. If the target spectrum area is not adjacent to the to-be-migrated carrier group, a spectral width of the target spectrum area needs to be greater than or equal to a spectral width of the to-be-migrated carrier group, so that the entire to-be-migrated carrier group can be migrated to the target spectrum area, and loss of services borne on the to-be-migrated carrier group is avoided.

2. If the target spectrum area is adjacent to the to-be-migrated carrier group, a relationship between a size of a spectral width of the target spectrum area and a size of a spectral width of the to-be-migrated carrier group is not limited. When the spectral width of the target spectrum area is less than the spectral width of the to-be-migrated carrier group, some of multiple carriers in the to-be-migrated carrier group can be migrated to the target spectrum area. These carriers are referred to as to-be-migrated carriers. A total spectral width of the to-be-migrated carriers is equal to or less than the spectral width of the target spectrum area.

Optionally, a rule of determining, by the NMS, a spectrum of a secondary carrier, a to-be-migrated target carrier group, and a to-be-migrated carrier in the target carrier group is as follows: after a service borne on the to-be-migrated carrier is migrated to the secondary carrier, an idle spectrum corresponding to the to-be-migrated carrier and its adjacent idle spectrum can form a consecutive idle spectrum area; in addition, a spectral width of the consecutive idle spectrum area is not less than a spectral width required to transmit a new service. This meets a spectral width requirement of the new service.

FIG. 4 shows an implementation process of a hitless multi-carrier spectrum migration method according to an embodiment of the present invention. The process of the method is executed by a network device.

In step S101, obtain a spectrum of a secondary carrier and a to-be-migrated carrier in a target carrier group from a network management system, and generate the secondary carrier according to the spectrum of the secondary carrier.

The secondary carrier may be generated by using a laser. There may be one or more secondary carriers, which is not limited in the present invention. A larger quantity of secondary carriers indicates a larger quantity of services to be migrated each time.

In step S102, send a migration notification to a peer network device, and perform answer response to the migration notification from the peer network device, where the answer response is used to determine that network devices at both ends can perform spectrum migration.

Optionally, the migration notification includes an adding notification (ADD) and a removing notification (REMOVE). A source network device and a destination network device initiate an ADD notification exchange over the secondary carrier, indicating that a carrier that bears the ADD notification is the secondary carrier.

The source network device and the destination network device initiate a REMOVE notification exchange over the to-be-migrated carrier in the target carrier group, indicating that a carrier that bears the REMOVE notification is the to-be-migrated carrier in the target carrier group.

The answer response includes an adding response and a removing response, which are respectively borne on the secondary carrier and the to-be-migrated carrier in the target carrier group.

In step S103, send migration signaling to the peer network device, where the migration signaling is used to instruct the peer network device to switch a service that is borne on the to-be-migrated carrier in the target carrier group to the secondary carrier.

Optionally, after the source network device and the destination network device determine that they have successfully negotiated, they separately initiate the migration signaling (NORMAL). The migration signaling is used to instruct the peer network device to migrate the service starting from the Xth frame after a current frame, where X is a positive integer greater than 1.

In step S104, receive the migration signaling sent by the peer network device, and migrate, according to the migration signaling, overhead information and the service that are borne on the to-be-migrated carrier in the target carrier group to the secondary carrier.

Optionally, after the source network device and the destination network device receive the NORMAL signaling from each other, they learn that the service is to be switched starting from the Xth frame after the current frame.

After a service borne on a to-be-migrated carrier is migrated to a secondary carrier, an idle spectrum corresponding to the to-be-migrated carrier and its adjacent idle spectrum can form a consecutive idle spectrum area. In addition, a spectral width of the consecutive idle spectrum area is not less than a spectral width required to transmit a new service. This meets a spectral width requirement of the new service.

In this embodiment of the present invention, after network devices negotiate successfully by exchanging a migration notification and migration signaling, the whole or a part of a to-be-migrated carrier group is migrated to a secondary carrier, so that an idle spectrum corresponding to a to-be-migrated carrier and its adjacent idle spectrum can form a consecutive idle spectrum area. In addition, a spectral width of the consecutive idle spectrum area meets a spectral width requirement of a new service. This improves usage of spectrum bandwidth of an optical fiber.

Figure 5:
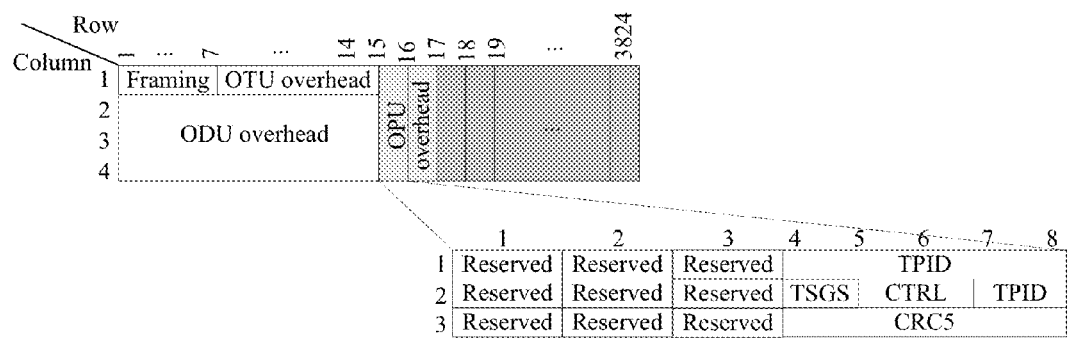
FIG. 5 is a schematic diagram of migration protocol information according to an embodiment of the present invention.

Optionally, the following migration protocol is used to implement hitless migration of spectrums between multiple carrier groups in this embodiment of the present invention. Migration protocol information of the migration protocol includes a migration notification and its answer response, migration signaling, and the like. As an example, as shown in FIG. 5, the migration protocol information of the migration protocol includes a control field CTRL, a port field TPID, a response field TSGS. For example, a format of the migration protocol information is {CTRL, TPID, TSGS}.

The control field CTRL is used to transmit control signaling. For example, the control field CTRL occupies 2 bits; 00 indicates idle signaling (IDLE), 01 indicates an adding notification (ADD), 10 indicates a removing notification (REMOVE), and 11 indicates migration signaling (NORMAL, used to indicate that a service is to be migrated).

The port field TPID (Tributary Port ID) is used to identify a current bearer container. The bearer container is modulated on a secondary carrier and a to-be-migrated carrier. For example, the port field TPID occupies 7 bits.

The response field TSGS (Tributary Slot Group Status) indicates a response status. For example, the response field TSGS occupies 1 bit; 1 indicates an ACK state (agree), and 0 indicates a NACK state (reject).

As an example, the migration protocol information is placed in an overhead of a to-be-added OTUsub frame and an overhead of a to-be-removed OTUsub frame, for example, rows 1, 2 and 3 in the 15th column. A distribution pattern and a location of the migration protocol information are not limited to what is shown in FIG. 5. The migration protocol information may be placed in another reserved overhead area.

Figure 6:
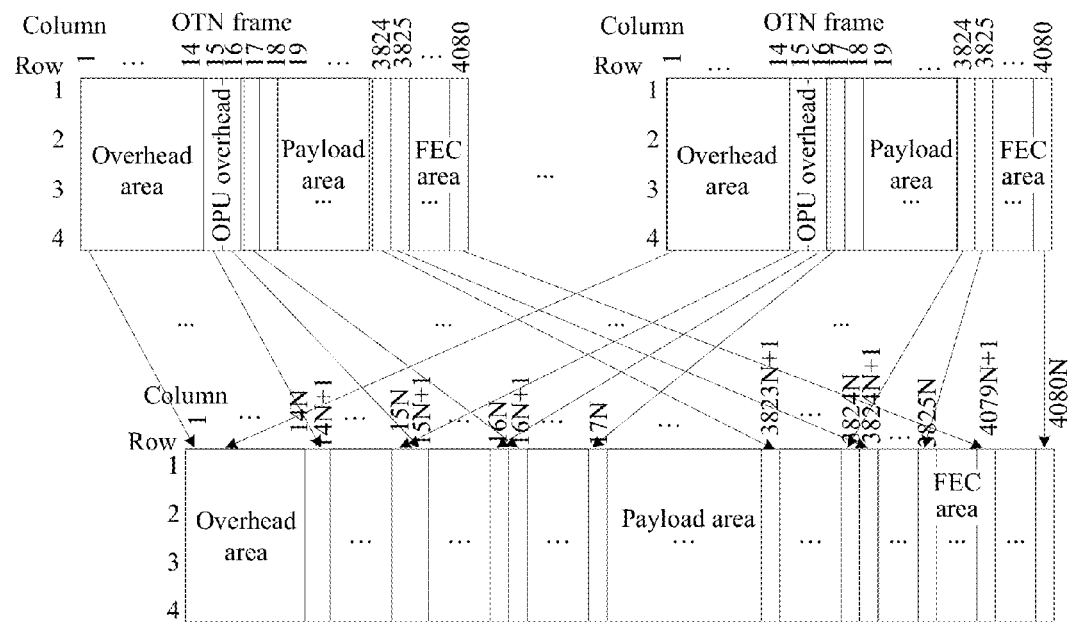
FIG. 6 is a schematic diagram of a frame structure of a bearer container according to an embodiment of the present invention.

FIG. 6 is a schematic diagram of a frame structure of a bearer container according to an embodiment of the present invention. The bearer container is represented by OTU-N and indicates that the bearer container includes N subframes. The bearer container includes N subframes that are interleaved by column. A rate and a frame structure of the bearer container vary according to a value of N. A rate of each subframe is referred to as a reference rate level. The subframe is referred to as an optical sub-channel transport unit (OTUsub, Optical sub-channel Transport Unit) frame in the prior art. N has a same value and is a positive integer greater than 1 in this specification. Optionally, a frame structure of the subframe is an OTN frame structure complying with the ITU-T G.709 standard, that is, the frame structure contains 4 rows and 4080 columns. The 1st column to the 14th column include a framing area, an OTU overhead area, and an ODU overhead area. The 15th column to the 16th column are an OPU overhead area. The 17th column to the 3824th column are an OPU payload area. The 3824th column to the 4080th column are a forward error correction (FEC, forward error correction) area.

A structure of the bearer container includes 4 rows and 4080×N columns. The 1st column to the 14Nth column include an OTU-N framing area, an OTU-N overhead area, and an ODU-N overhead area. The 14N+1th column to the 16Nth column are an OPU-N overhead area. The 16N+1th column to the 3824Nth column are an OPU-N payload area. The 3824N+1th column to the 4080Nth column is a FEC (forward error correction, forward error correction) overhead area.

Figure 7:
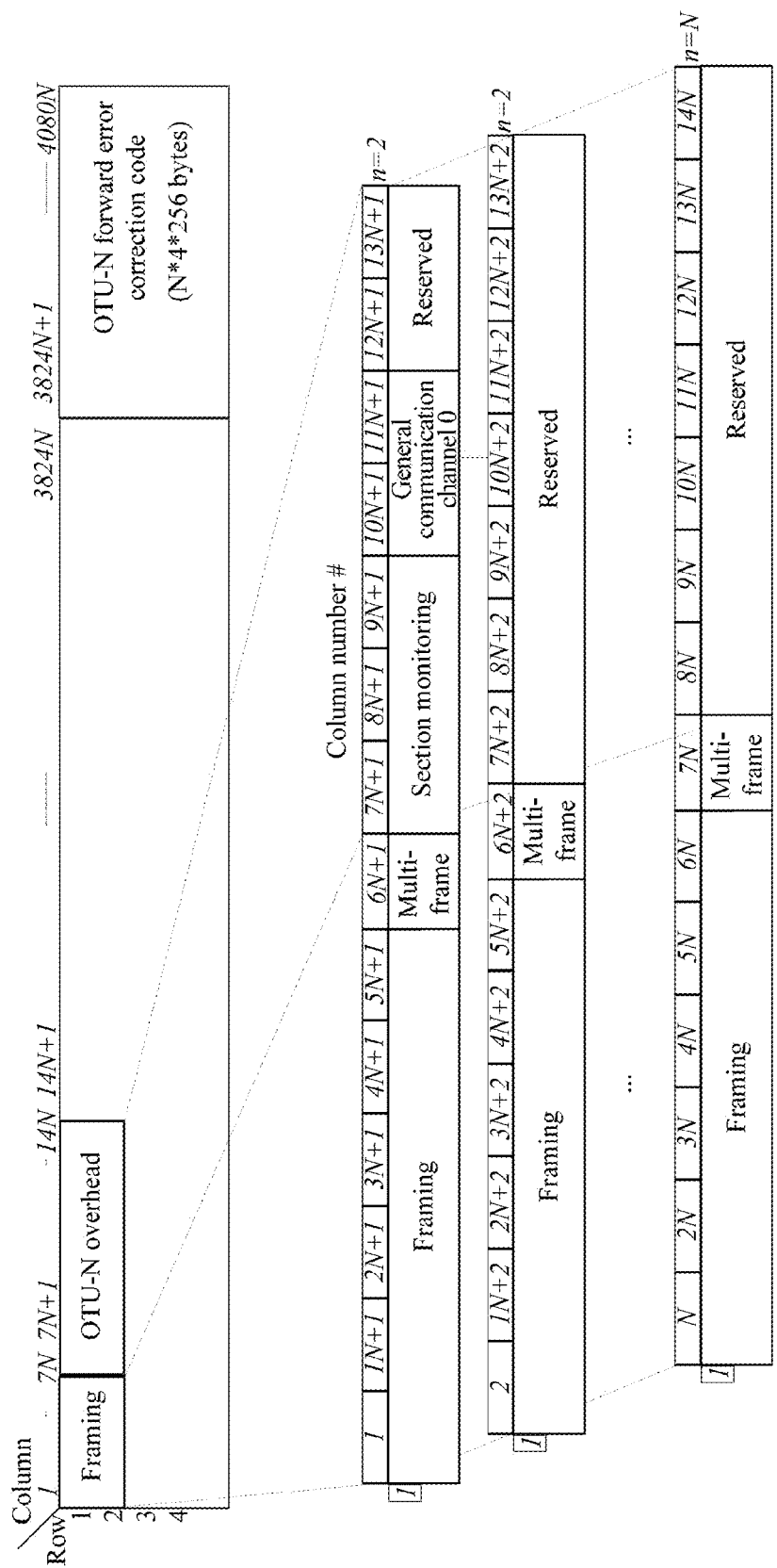
FIG. 7 is a schematic diagram of an overhead of the bearer container according to the embodiment of the present invention.

In an embodiment, as shown in FIG. 7, all overhead information in one OTN frame of N OTN frames is used as overhead information of the OTU-N, while only FAS (Frame Alignment Signal, frame alignment signal) and MFAS (Multi-frame Alignment Signal, multiframe alignment signal) of other N−1 OTN frames are placed in an overhead area, of the OTU-N, from the first row and the 1st column to the 7Nth column.

An optical channel data unit of the bearer container is referred to as ODU-N. An optical channel payload unit of the bearer container is referred to as OPU-N. The service mentioned above is mapped to the optical channel payload unit OPU-N of the bearer container.

Figure 8:
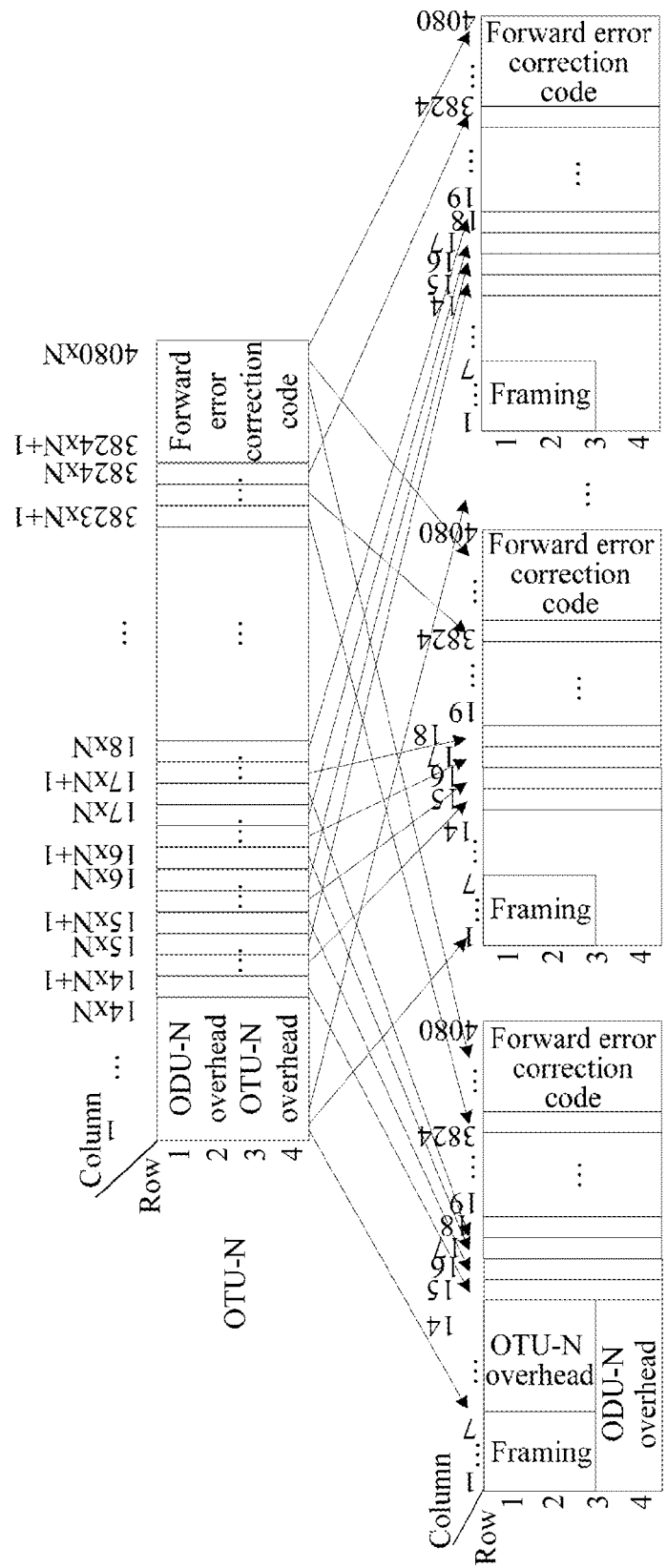
FIG. 8 is a schematic diagram of splitting a bearer container according to an embodiment of the present invention.

In this embodiment of the present invention, a processing process in which the bearer container is modulated to a carrier group including M carriers is as follows: As shown in FIG. 8, the bearer container is split into N optical subchannel transport unit (OTUsub, Optical sub-channel Transport Unit) frames which are interleaved by column; the N OTUsub frames are divided into M groups, where the numeric value M is a positive integer; each group of OTUsub frames is modulated to a carrier. The numeric value N is set to an integral multiple of the numeric value M, for example, the numeric value M may be set to a value that is obtained by rounding up a quotient that is obtained when an amount of traffic of the service is divided by bearer bandwidth of a carrier. Optionally, N is equal to M.

The migration protocol information is placed in the overhead of the to-be-added OTUsub frame and the overhead of the to-be-removed OTUsub frame, for example, an overhead of OPUsub. The to-be-added OTUsub frame is an OTUsub frame that is modulated to the secondary carrier. The to-be-removed OTUsub frame is an OTUsub frame that is modulated to the to-be-migrated carrier.

Figure 9:
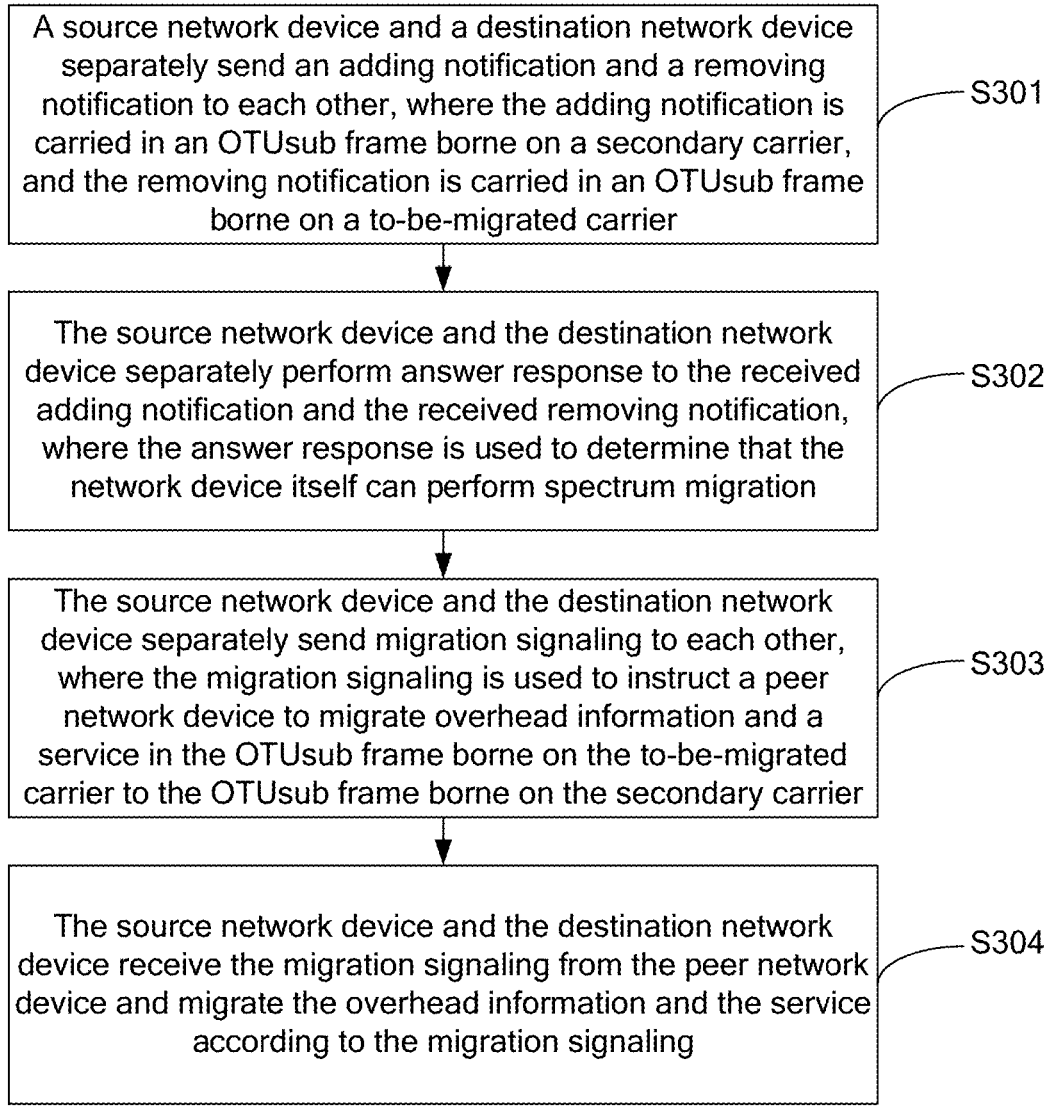
FIG. 9 and FIG. 10 are flowcharts of another service transmission method according to an embodiment of the present invention.
Figure 10:
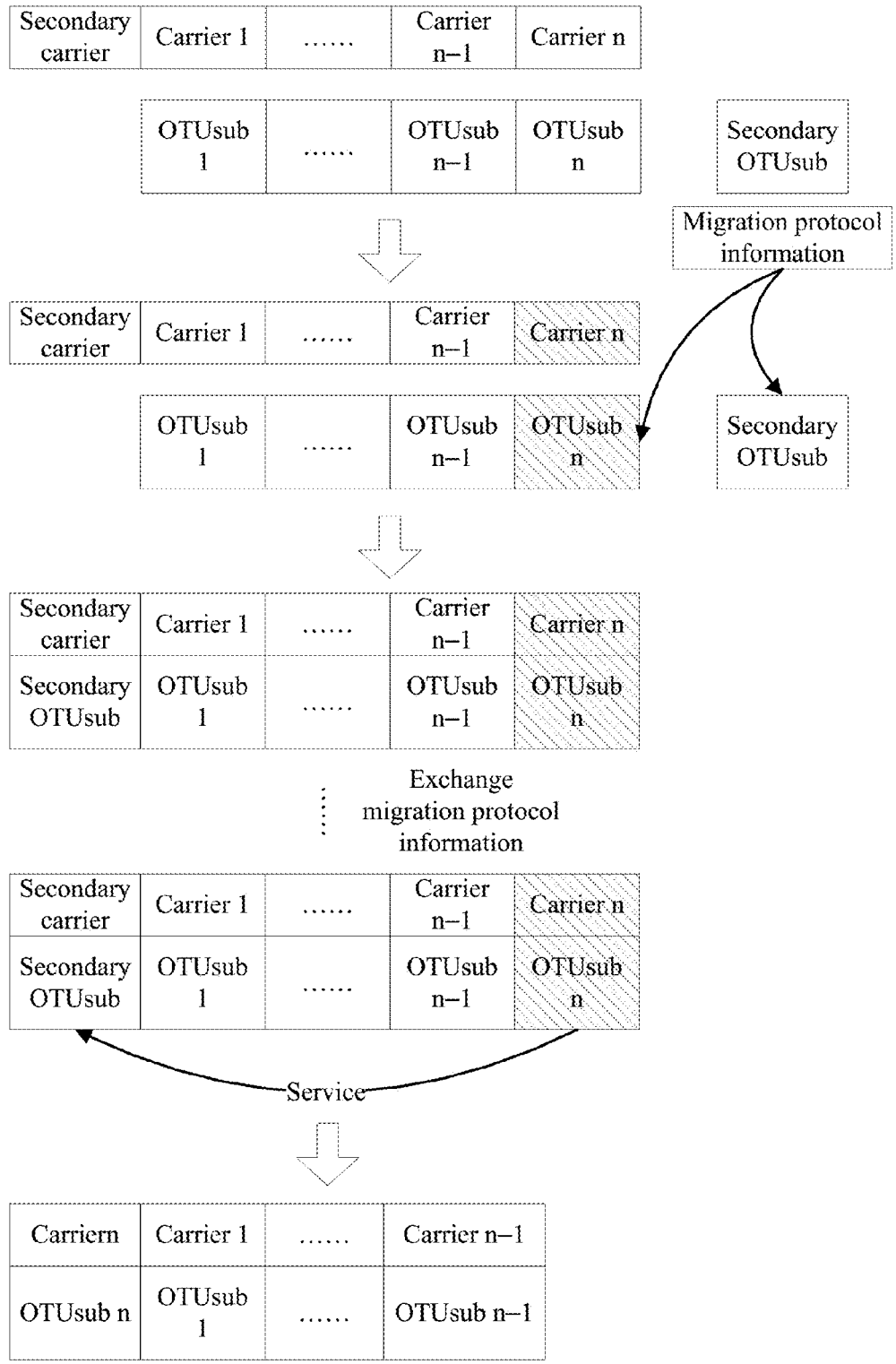

FIG. 9 and FIG. 10 describe a process in which spectrum migration is performed by using migration protocol information. Each carrier in a to-be-migrated carrier group bears one or more optical subchannel transport unit (OTUsub, Optical sub-channel Transport Unit) frames. An example in which each carrier bears one OTUsub frame is described below.

In step S301, a source network device and a destination network device separately send an adding notification and a removing notification to each other, where the adding notification is carried in an OTUsub frame borne on a secondary carrier, and the removing notification is carried in an OTUsub frame borne on a to-be-migrated carrier.

Figure 11:
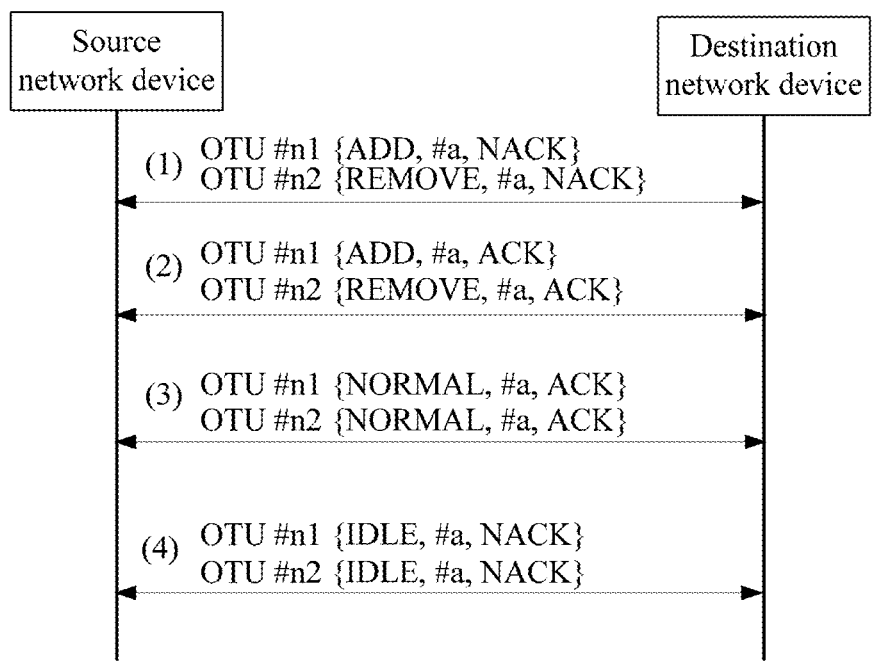
FIG. 11 is a schematic diagram of a migration protocol information exchange process according to an embodiment of the present invention.

As an example, as shown in FIG. 11, the adding notification is expressed as {ADD, #a, NACK}, and is carried in an OTUsub frame (OTU #n1) numbered #n1 on the secondary carrier, where ADD (a control field CTRL) indicates that signaling carried in the OTUsub frame numbered #n1 is adding signaling, #a (a port field TPID) indicates an identifier of a carrier group that bears the adding notification, and NACK indicates a status of a response field TSGS, with a default value 0.

The removing notification is expressed as {REMOVE, #a, NACK}, and is carried in an OTUsub frame (OTU #n2) numbered #n2 on the to-be-migrated carrier, where REMOVE (a control field CTRL) indicates that signaling carried in the OTUsub frame numbered #n2 is removing signaling, #a (a port field TPID) indicates an identifier of a carrier group that bears the removing notification, and NACK indicates a status of a response field TSGS, with a default value 0.

In step S302, the source network device and the destination network device separately perform answer response to the received adding notification and the received removing notification, where the answer response is used to determine that the network device itself can perform spectrum migration.

Optionally, the answer response includes an adding response and a removing response that are expressed as {ADD, #a, ACK} and {REMOVE, #a, ACK} respectively. ACK indicates that a status of a response field TSGS is agree, and a numeric value is set to 1; {ADD, #a, ACK} is carried in the OTUsub frame numbered #n1 (that is, OTU #n1) on the secondary carrier; {REMOVE, #a, ACK} is carried in the OTUsub frame numbered #n2 (that is, OTU #n2) on the to-be-migrated carrier.

In step S303, the source network device and the destination network device separately send migration signaling to each other, where the migration signaling is used to instruct a peer network device to migrate overhead information and a service in the OTUsub frame borne on the to-be-migrated carrier to the OTUsub frame borne on the secondary carrier. As an example, the migration signaling is expressed as {NORMAL, #a, NACK}.

Optionally, after the source network device and the destination network device determine that they have successfully negotiated, they separately initiate the migration signaling (NORMAL) to instruct the peer network device to switch the service starting from the Xth frame after a current frame, where X is a positive integer greater than 1.

In step S304, the source network device and the destination network device receive the migration signaling from the peer network device and migrate the overhead information and the service according to the migration signaling. Optionally, after the source network device and the destination network device receive the NORMAL signaling from the peer network device, they learn that the service is to be switched starting from the Xth frame after the current frame.

Optionally, in an embodiment, after the service is migrated, the source network device and the destination network device separately send idle signaling to each other, where the idle signaling indicates that the service has been migrated. As an example, the idle signaling is expressed as {IDLE, #a, NACK}.

Figure 12:
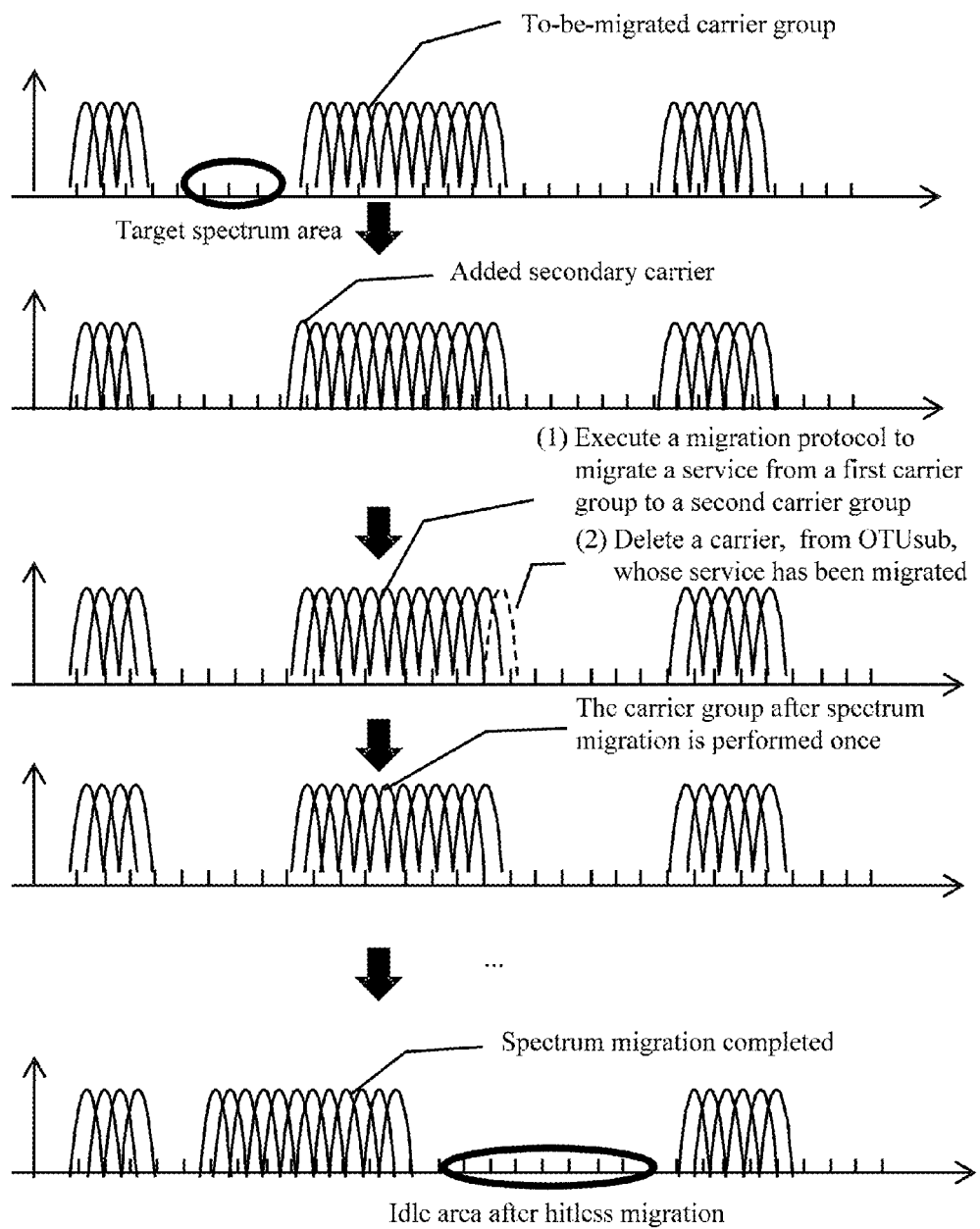
FIG. 12 is a schematic diagram of a spectrum migration process of a carrier according to an embodiment of the present invention.

As an example, FIG. 12 shows a process of one spectrum migration of a carrier group. In FIG. 12(a), a target spectrum area is adjacent to a to-be-migrated carrier group. For ease of description, in this embodiment, carriers in the to-be-migrated carrier group are numbered, which are sequentially a carrier 1, a carrier 2, . . . , and a carrier 12 from left to right. The to-be-migrated carrier group is expressed as a 12-carrier group. A bearer container borne on the 12-carrier group is expressed as an OTU-12 frame, where 12 OTUsub frames of the OTU-12 frame are expressed as OTU #1, OTU #2, . . . , and OTU #12, and respectively modulated to the carrier 1, the carrier 2, . . . , and the carrier 12, that is, the OTU-12 frame is transmitted over the carrier 1, the carrier 2, . . . , and the carrier 12.

The spectrum migration process is as follows:

(1) As shown in FIG. 12(b), generate a secondary carrier, and add the secondary carrier to the left of the 12-carrier group to form a 13-carrier group.

(2) Generate an OTU #13 subframe, where the OTU #13 subframe corresponds to the secondary carrier. In this case, the OTU #13 subframe does not bear a service. The service is still borne on the OTU-12 frame and transmitted by the 12-carrier group.

(3) Determine a to-be-migrated carrier (for example, the carrier 12) and its corresponding subframe (for example, OTU #12). As an example, for multiple carriers based on orthogonal frequency division multiplexing, the to-be-migrated carrier may be the rightmost carrier 12, and the carrier 12 bears the OTU #12, which is not intended to limit the present invention. Alternatively, the to-be-migrated carrier may be the leftmost carrier 1. This may be implemented by setting a migration rule. In addition, for multiple carriers based on Nyquist (Nyquist), the to-be-migrated carrier may be a carrier on either side, or may be any carrier in the middle, for example, the carrier 6.

(4) As shown in FIG. 12(c), use the OTU #12 and OTU #13 subframes to transfer migration protocol information, to complete migration of the service from a first OTU-12 frame to a second OTU-12 frame, that is, migration from a first 12-carrier group to a second 12-carrier group. In this way, hitless spectrum migration is implemented.

The first OTU-12 frame includes the following 12 OTU-sub frames: OTU #1, OTU #2, . . . , OTU #11, and OTU #12. The first OTU-12 frame is borne on the first 12-carrier group. The first 12-carrier group includes the following 12 carriers: the carrier 1, the carrier 2, . . . , the carrier 11, and the carrier 12.

The second OTU-12 frame includes the following 12 OTUsub frames: OTU #1, OTU #2, . . . , OTU #11, and OTU #13. The second OTU-12 frame is borne on the second 12-carrier group. The second 12-carrier group includes the following 12 carriers: the carrier 1, the carrier 2, . . . , the carrier 11, and the carrier 13.

Optionally, in an embodiment, after the service is migrated, the source network device and the destination network device separately send idle signaling to each other, where the idle signaling indicates that the service has been migrated. As shown in FIG. 12(d), after the service is migrated, a spectrum of the to-be-migrated carrier 12 becomes an idle spectrum.

After the to-be-migrated carrier group is migrated once in the foregoing steps, the 12-carrier group after spectrum migration is numbered again sequentially from left to right, which includes a carrier 1, a carrier 2, . . . , and a carrier 12. The 12-carrier group is represented by an OTU-12 carrier group. The 12 OTUsub frames borne on the OTU-12 carrier group are OTU #1, OTU #2, . . . , and OTU #12, and respectively carried on the carrier 1, the carrier 2, . . . , and the carrier 12. Repeat the foregoing steps until the 12-carrier group is migrated to the target spectrum area, as shown in FIG. 12(e).

Figure 13:
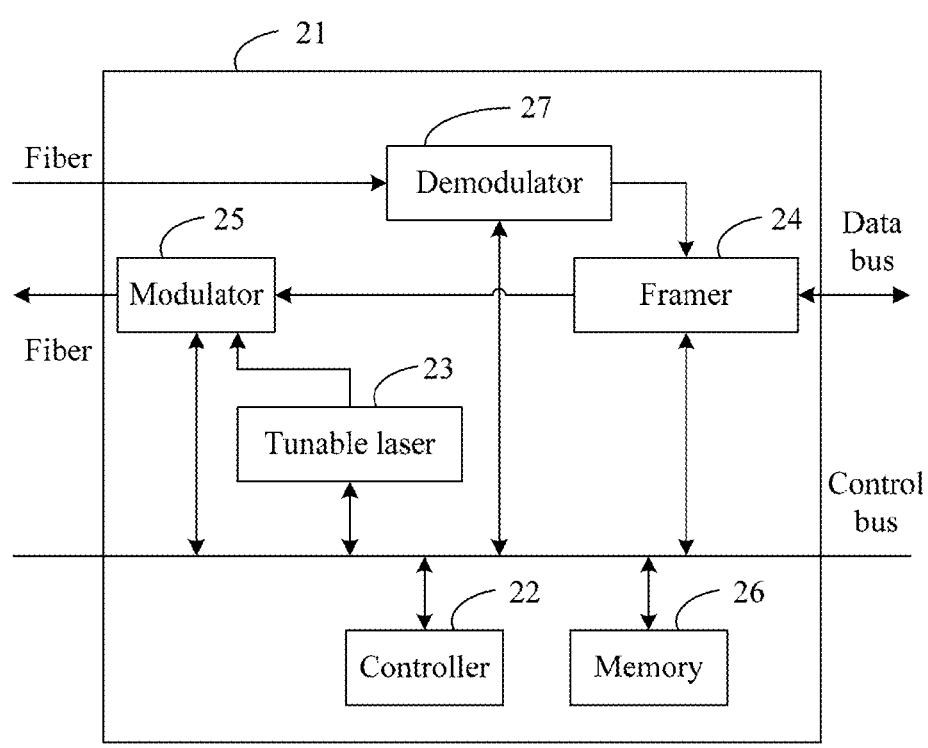
FIG. 13 is a schematic diagram of a structure of a network device according to an embodiment of the present invention.

FIG. 13 shows a schematic diagram of a structure of a network device according to an embodiment of the present invention. As a transmit end of a service, the network device 21 executes the foregoing hitless multi-carrier spectrum migration method. The network device 21 includes a controller 22, a tunable laser 23, a framer 24, a modulator 25, and a memory 26.

The controller 22 is configured to: receive a spectrum of a secondary carrier, a spectrum of a target carrier group, a to-be-migrated carrier in the target carrier group, and a to-be-migrated optical sub-channel transport unit (OTUsub, Optical sub-channel Transport Unit) frame corresponding to the to-be-migrated carrier from a network management system; send the spectrum of the secondary carrier and the spectrum of the target carrier group to the tunable laser 23; notify the modulator of the to-be-migrated carrier in the target carrier group; and notify the framer 24 of the to-be-migrated OTUsub frame.

The tunable laser 23 is configured to generate the secondary carrier according to the spectrum of the secondary carrier; and is configured to generate carriers in the target carrier group according to the spectrum of the target carrier group, where the carriers in the target carrier group include the to-be-migrated carrier.

The framer 24 is configured to invoke executable code stored in the memory 26, so as to: determine the to-be-migrated OTUsub frame that is notified by the controller 22 and generate a secondary OTUsub frame; encapsulate migration protocol information into an overhead of the to-be-migrated OTUsub frame and an overhead of the secondary OTUsub frame, and send the to-be-migrated OTUsub frame and the secondary OTUsub frame to the modulator 25; and after determining, according to migration protocol information fed back by a peer network device, that the current network device 21 has successfully negotiated with the peer network device, encapsulate overhead information and a service carried in the to-be-migrated OTUsub frame into the secondary OTUsub frame and send the secondary OTUsub frame to the modulator 25.

The modulator 25 is configured to: receive the to-be-migrated OTUsub frame and the secondary OTUsub frame that are sent by the framer 24; modulate the secondary OTUsub frame to the secondary carrier and send the secondary OTUsub frame to the peer network device; and modulate the to-be-migrated OTUsub frame to the to-be-migrated carrier and send the to-be-migrated OTUsub frame to the peer network device.

Optionally, the network device 21 further includes a demodulator 27 in this embodiment of the present invention. The demodulator 27 is configured to receive a first carrier group and a second carrier group, modulate a first group of OTUsub frames from the first carrier group, and modulate a second group of OTUsub frames from the second carrier group, where the first group of OTUsub frames includes the to-be-migrated OTUsub frame and the secondary OTUsub frame, the to-be-migrated OTUsub frame and the secondary OTUsub frame each carry the migration protocol information, and the second group of OTUsub frames includes the secondary OTUsub frame but does not include the to-be-migrated OTUsub frame.

The framer 24 is further configured to invoke executable code stored in the memory, so as to: receive the first group of OTUsub frames and the second group of OTUsub frames from the demodulator 27; use the second group of OTUsub frames to form a bearer container after determining, according to the migration protocol information carried in the to-be-migrated OTUsub frame and the secondary OTUsub frame, that the current network device 21 has successfully negotiated with the peer network device; and extract the service from the bearer container.

Optionally, in this embodiment of the present invention, the migration protocol information includes a migration notification and its answer response, migration signaling, and the like, where the answer response of the migration notification is used to determine that the current network device 21 has successfully negotiated with the peer network device.

Optionally, the migration notification includes an adding notification (ADD) and a removing notification (REMOVE). A source network device and a destination network device initiate an ADD notification exchange over the secondary carrier, indicating that a carrier that bears the ADD notification is the secondary carrier.

The source network device and the destination network device initiate a REMOVE notification exchange over the to-be-migrated carrier in the target carrier group, indicating that a carrier that bears the REMOVE notification is the to-be-migrated carrier in the target carrier group.

The answer response includes an adding response and a removing response, which are respectively borne on the secondary carrier and the to-be-migrated carrier in the target carrier group.

Optionally, after the source network device and the destination network device determine that they have successfully negotiated, they separately initiate the migration signaling (NORMAL). The migration signaling is used to instruct the peer network device to migrate the overhead information and the service from the Xth frame after a current frame, where X is a positive integer greater than 1.

Optionally, after the source network device and the destination network device receive the NORMAL signaling from each other, they learn that the overhead information and the service are to be switched starting from the Xth frame after the current frame.

Optionally, in an embodiment, the framer 24 is further configured to encapsulate the received service into the bearer container, split the bearer container into N OTUsub frames, and send the N OTUsub frames to the modulator 25.

Optionally, in another embodiment, the carrier group includes M carriers. A quantity N of the OTUsub frames is an integral multiple of the quantity M of the carriers. Preferably, M is equal to N.

Optionally, in an embodiment, before determining that the current network device 21 has successfully negotiated with the peer network device, the framer 24 is further configured to use other OTUsub frames except the secondary OTUsub frame in the first group of OTUsub frames to form another bearer container, and extract a service from the another bearer container.

After the overhead information and the service borne on the to-be-migrated carrier are migrated to the secondary carrier, an idle spectrum corresponding to the to-be-migrated carrier and its adjacent idle spectrum can form a consecutive idle spectrum area. In addition, a spectral width of the consecutive idle spectrum area is not less than a spectral width required to transmit a new service. This meets a spectral width requirement of the new service.

In this embodiment of the present invention, after network devices negotiate successfully by exchanging migration protocol information, the whole or a part of a to-be-migrated carrier group is migrated to a secondary carrier, so that an idle spectrum corresponding to a to-be-migrated carrier and its adjacent idle spectrum can form a consecutive idle spectrum area. In addition, a spectral width of the consecutive idle spectrum area meets a spectral width requirement of a new service. This improves usage of spectrum bandwidth of an optical fiber.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

The controller 22 may be a general central control unit (CPU), a microcontroller, an application-specific integrated circuit (ASIC, application-specific integrated circuit), or one or more integrated circuits that are configured to control execution of a program in solutions of the present invention. One or more memories further included in a computer system may be a read-only memory (ROM) or other types of static memory devices able to store static information and instructions, or a random access memory (RAM) or other types of dynamic memory devices able to store information and instructions, or a disk memory. The memories are connected to the controller by using a bus.

The network device 21 further includes a communications interface. The communications interface may be a type of apparatus that uses any transceiver, so as to communicate with other devices or communications networks, such as the Ethernet, a radio access network (RAN), and a wireless local area network (WLAN).

The memory 26, such as a RAM, stores a program that executes the solutions of the present invention, or stores an operating system, other application programs, and/or Ethernet data. Program code that executes the solutions of the present invention is stored in the memory 26 and execution is controlled by the controller 22.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A hitless multi-carrier spectrum migration method, wherein the method comprises:
   obtaining a spectrum of a secondary carrier and a to-be-migrated carrier in a target carrier group from a network management system, and generating the secondary carrier according to the spectrum of the secondary carrier;
   sending a migration notification to a peer network device, and performing answer response to a migration notification from the peer network device, wherein the answer response is used to determine that network devices at both ends can perform spectrum migration;
   sending first migration signaling to the peer network device, wherein the first migration signaling is used to instruct the peer network device to switch a service that is borne on the to-be-migrated carrier in the target carrier group to the secondary carrier; and
   receiving second migration signaling sent by the peer network device, and migrating, according to the second migration signaling, overhead information and the service that are borne on the to-be-migrated carrier in the target carrier group to the secondary carrier, wherein after the service that is borne on the to-be-migrated carrier is migrated to the secondary carrier, an idle spectrum corresponding to the to-be-migrated carrier and an adjacent idle spectrum form a consecutive idle spectrum area.

2. The method according to claim 1, wherein the migration notification comprises an adding notification and a removing notification, wherein the adding notification is borne on the secondary carrier, and the removing notification is borne on the to-be-migrated carrier.

3. The method according to claim 1, wherein the adding notification is carried in an optical sub-channel transport unit (OTUsub) frame borne on the secondary carrier, and the removing notification is carried in an OTUsub frame borne on the to-be-migrated carrier.

4. The method according to claim 1, wherein the first migration signaling is used to instruct the peer network device to migrate overhead information and a service in an optical sub-channel transport unit (OTUsub) frame borne on the to-be-migrated carrier to an OTUsub frame borne on the secondary carrier.

5. The method according to claim 1, wherein after the service is migrated, a source network device and a destination network device separately send idle signaling to each other, wherein the idle signaling indicates that the service has been migrated.

6. The method according to claim 1, wherein the first migration signaling is used to instruct the peer network device to switch the service starting from an Xth frame after a current frame, wherein X is a positive integer greater than 1.

7. A hitless multi-carrier spectrum migration apparatus, wherein the apparatus comprises a controller, a tunable laser, a framer, and a modulator;
   wherein the controller is configured to: receive a spectrum of a secondary carrier, a spectrum of a target carrier group, a to-be-migrated carrier in the target carrier group, and a to-be-migrated optical sub-channel transport unit (OTUsub) frame corresponding to the to-be-migrated carrier from a network management system; send the spectrum of the secondary carrier and the spectrum of the target carrier group to the tunable laser; notify the modulator of the to-be-migrated carrier in the target carrier group; and notify the framer of the to-be-migrated OTUsub frame;
   wherein the tunable laser is configured to: generate the secondary carrier according to the spectrum of the secondary carrier; and generate carriers in the target carrier group according to the spectrum of the target carrier group, wherein the carriers in the target carrier group comprise the to-be-migrated carrier;
   the framer is configured to: determine the to-be-migrated OTUsub frame that is notified by the controller and generate a secondary OTUsub frame; encapsulate a migration notification into an overhead of the to-be-migrated OTUsub frame and an overhead of the secondary OTUsub frame, and send the to-be-migrated OTUsub frame and the secondary OTUsub frame to the modulator; and after determining, according to an answer response fed back by a peer network device, that the current network device has successfully negotiated with the peer network device, encapsulate overhead information and a service carried in the to-be-migrated OTUsub frame into the secondary OTUsub frame and send the secondary OTUsub frame to the modulator; and
   wherein the modulator is configured to: receive the to-be-migrated OTUsub frame and the secondary OTUsub frame that are sent by the framer; modulate the secondary OTUsub frame to the secondary carrier and send the secondary OTUsub frame to the peer network device; and modulate the to-be-migrated OTUsub frame to the to-be-migrated carrier and send the to-be-migrated OTUsub frame to the peer network device.

8. The apparatus according to claim 7, further comprising a demodulator, wherein the demodulator is configured to receive a first carrier group and a second carrier group, modulate a first group of OTUsub frames from the first carrier group, and modulate a second group of OTUsub frames from the second carrier group, wherein the first group of OTUsub frames comprises the to-be-migrated OTUsub frame and the secondary OTUsub frame, the to-be-migrated OTUsub frame and the secondary OTUsub frame each carry the answer response, and the second group of OTUsub frames comprises the secondary OTUsub frame but does not comprise the to-be-migrated OTUsub frame.

9. The apparatus according to claim 8, wherein the framer is further configured to: receive the first group of OTUsub frames and the second group of OTUsub frames from the demodulator; use the second group of OTUsub frames to form a bearer container after determining, according to the answer response carried in the to-be-migrated OTUsub frame and the secondary OTUsub frame, that the current network device has successfully negotiated with the peer network device; and extract the service from the bearer container.

10. The apparatus according to claim 7, wherein the migration notification comprises an adding notification and a removing notification, wherein the adding notification is carried in the OTUsub frame borne on the secondary carrier, and the removing notification is carried in the OTUsub frame borne on the to-be-migrated carrier.

11. The apparatus according to claim 7, wherein migration signaling is used to instruct the peer network device to migrate overhead information and a service in the OTUsub frame borne on the to-be-migrated carrier to the OTUsub frame borne on the secondary carrier.

12. The apparatus according to claim 7, wherein after the service is migrated, a source network device and a destination network device separately send idle signaling to each other, wherein the idle signaling indicates that the service has been migrated.

13. The apparatus according to claim 7, wherein the migration signaling is used to instruct the peer network device to switch the service starting from an Xth frame after a current frame, wherein X is a positive integer greater than 1.

* * * * *